United States Patent [19]

Lake et al.

[11] Patent Number: 5,752,498
[45] Date of Patent: May 19, 1998

[54] ELLIPTICAL BEAM LOAD CELL

[76] Inventors: Jared L. Lake, 1365 Old Garth Hts., Charlottesville, Va. 22901; Brad C. Koelblinger, 1302 Little Fawn, Fairfield, Iowa 52556

[21] Appl. No.: 592,865

[22] Filed: Jan. 24, 1996

Related U.S. Application Data

[63] Continuation-in-part of Ser. No. 319,935, Oct. 7, 1994, Pat. No. 5,546,926.

[51] Int. Cl.$^6$ .................. F24F 3/14; G01G 3/14
[52] U.S. Cl. .......... 126/113; 137/403; 177/211; 392/402
[58] Field of Search ............... 126/113; 392/391, 392/402, 142; 261/DIG. 46, DIG. 45, DIG. 65; 137/403; 177/211, 118

[56] References Cited

U.S. PATENT DOCUMENTS

| | | | |
|---|---|---|---|
| 3,209,124 | 9/1965 | Morrissey et al. | 126/113 X |
| 3,774,588 | 11/1973 | Yeagle | 126/113 |
| 5,252,260 | 10/1993 | Schuman | 126/113 X |
| 5,313,022 | 5/1994 | Piroozmandi et al. | 177/211 |
| 5,546,926 | 8/1996 | Lake | 261/142 X |

*Primary Examiner*—William E. Wayner
*Attorney, Agent, or Firm*—Sheldon H. Parker

[57] ABSTRACT

A humidifier for use with a hot air furnace has an upper and lower housing removably connected to one another. The upper housing has a heating element and sensor, water refill inlet, and a control circuit connected to the heat sensor and inlet. The lower housing contains a water vessel and a water level sensor secured the lower housing to receive the water vessel. The water sensor registers the minimum and maximum water weight and is connected to the control circuit. A bacteria resistant, semi-flexible removable liner fits within the vessel for the removal of built up mineral residue. Preferably the water sensor is an elliptical beam load cell with an open center surrounded by a rim and a pair of tab ends opposite one another. At least one bridge is machined within the rim to increase sensitivity. A strain gage registers strain changes and an electronic connector transfers the changes to the control circuit where they are converted to the current weight. Multiple steps along the rim receive the water vessel in insulating gaskets to prevent horizontal movement and temperature transfer. Ball bearings within the tabs balance the cell on a support ledge to allow for surface variations. Spring/screw combinations maintain the ball bearings in contact with the support ledge during mounting.

11 Claims, 12 Drawing Sheets

ELLIPTICAL BEAM LOAD CELL

This is a continuation-in-part of application Ser. No. 08/319,935 filed on Oct. 7, 1994 now U.S. Pat. No. 5,546,926.

BACKGROUND OF THE INVENTION

1. Field of the Invention

The invention discloses an elliptical beam load cell for measuring weight increments. The use described is for measuring the change in water level in a whole house humidifying system. A removable water liner is also disclosed for use in the humidifying system to facilitate cleaning.

2. Brief Description of the Prior Art

Humidifiers are commonly used in homes during the winter to supplement the drop in humidity due to heating systems. The body is 90% water and functions best when the humidity is 50% to 55% moisture in the environment. When air drops to 30 degrees or less, the mucus membranes, such nasal passages, throat and lungs, dry out, increasing the susceptibility to bacteria related diseases. Dry skin and itching are not only uncomfortable, but in the case of skin disorders, such as psoriasis, can increase health risks.

The actual temperature, relative to our comfort level, is based on the air moisture content. In hot dry climates, a 100° F. seems comfortable because we sweat and drink liquids to replace the lost moisture. In a cold dry climate, when we sweat, the function causes a "chill" effect to the skin making us feel cold. By adding moisture to the air we "sweat" less and hence feel warmer. The actual heat (temperature setting) needed at 50% humidity is as much as 4-5 degrees lower than a 20% humidity and provides the same comfort level. Cold outside air does not hold moisture and warm forced air heating further dries the indoor air. Cold, dry weather creates a moisture vacuum that needs to be filled indoors by adding humidity that is lost. The average 2400 square foot home needs 20 gallons per day in 10 degree weather to maintain a proper humidity content.

Further advantages to maintaining a proper humidity level is in the wood products within the home. Wood products contain moisture in the 6% to 12% range, which is easily maintained when the humidity is at the 50% level. When the moisture level drops, the moldings around doors and windows will dry out and twist, crack or separate. This loss of moisture doubly causes furniture to have warped doors, drawers and frames. Maintenance of moisture preserves the life of both furniture and interior construction materials.

The addition of water to the air to bring it within balance is the solution to an unhealthy low moisture environment. The most efficient way to add humidity to a home is through the use of a whole house humidifier. Stand alone humidifiers can use 20 gallons of water per day in the cold months and keeping the units filled is a never ending task. Whole house humidifiers are only used in warm forced air systems such as electric, gas or oil furnaces and work in three different and distinct ways. Prior art humidifiers are often used in heat pump systems and work poorly or not at all. There are three types of whole house humidifiers.

Media or drum humidifiers work by some type of cloth or sponge that is constantly wetted while the hot air from the system blows over it to absorb moisture. Because the water remains luke-warm, the water particles do not merge easily with the air unless the air is hot enough to evaporate the water. In a heat pump system, with 80–90 degree air temperature, the drum humidifiers work poorly because the media remains wet and the moderate temperature is a perfect temperature for bacteria to grow. This is an excellent incubator to grow and spread germs. The second problem with media humidifiers is their maintenance. Well and public water both have "trash" particles, such as chlorine, calcium, zinc, dirt, that clog the media and coats the float and water pan. This clogging requires frequent maintenance, as often as every few weeks, and takes from one to three hours to thoroughly clean the system. Most media systems also partially block the duct work obstructing air flow through the home.

These systems have the advantage of using little energy, using tap water, and unlike impeller systems, do not spray bacteria into the air along with moisture.

In the drum type humidifier disclosed in U.S. Pat. No. 3,476,673, a chamber is provided for holding tap water or other liquid which is applied to an evaporator medium of a rotating drum. The liquid is evaporated from the evaporator medium into a hot air stream from a furnace to humidify the air stream.

U.S. Pat. No. 4,222,971 teaches the use of a liner for a drum-type humidifier which can be readily removed and replaced as needed. This, however, does not solve the problem of chemicals adhering to the wheel or other passage ways where water is in contact.

Mist or spray systems use a fine nozzle to mist water directing into the duct work to blend with the forced air. With very hot systems (oil and gas) the system works adequately, but lacks sufficient volume. Further, the trash particles clog the system and the nozzle requires frequent cleaning. In heat pump systems, the air is too cold and much of the mist water falls into the duct system causing rust.

Free standing units are also used in the home to increase humidity levels. The ultrasonic humidifiers employ a transducer and nebulizer which oscillates at about 1.7 million times a second in order to form a cool mist. While few microorganisms are released into the air, an annoying white dust is produced from the tap water.

Steamer systems provide the answer to the problems with water holding bacteria, as well as the need to provide 20 gallons per day to the forced air system. Because the steamer system heats the water to the point of evaporation prior to sending it into the heating system, the 212 degree temperature kills all bacteria. With heat pump systems, the hot steam dissipates quickly into the 80 degree air temperature.

There are about 10 steamer humidifiers around but only three main manufacturers. One commercial steamer version by Herrmidifier is about $600.00 and requires "hand cleaning", as do all prior art steam units, to remove the built-up residue which accumulates. The other two are very similar to each other in design and are generally used when a steamer humidifier is installed by professionals. Because of the inherent problems associated with residue build-up, most all furnace installers avoid sales of humidifiers. The maintenance required generally costs about $100.00 per visit and may occur 2–3 times within a winter depending on water hardness. Most steamers clog-up the first few months, shut down and the homeowner abandons it. At approximately $600.00 installed, steamer humidifiers are not a popular purchase and are an avoided product by furnace installers and knowledgeable consumers. To mount present humidifier steamers requires mounting into the duct area, thereby restricting air flow, and only mount on a horizontal duct. The maintenance on these systems is quite high due to the residue accumulation in combination with the high operating temperatures.

Impeller systems employ a fan or impeller which pumps water upwardly and slings water droplets into the air. The systems require soft water, distilled water or a demineralization cartridge rather than being a simple, tap water system.

The chemical build-ups, that is mineral deposits in units such as these, can greatly reduce the efficiency of the humidifier. In areas where there is heavy chemical content in the water, the units can require constant cleaning.

The instant invention overcomes the problems associated with the prior art by eliminating the moving parts which are susceptible to chemical accumulation and by providing an easily cleaned, low cost liner which serves to minimize the cleaning operation normally associated with humidifiers.

SUMMARY OF THE INVENTION

A humidifier for use with a hot air furnace consists of an upper and lower housing removable connected to one another. The upper housing has a heating element with a heat sensor, water refill inlet, and a control circuit which is connected to the heat sensor and water refill inlet. The lower housing contains a water retaining vessel and a water level sensor. The water level sensor is secured to a support ledge within the lower housing and positioned to receive the water retaining vessel. The water level sensor registers the minimum and maximum water weight within said water retaining vessel and is connected to the control circuit, which controls the water level based on the weight information received from the water level sensor. The control circuit controls the temperature based on information received from the heat sensor, thereby providing a constant level of evaporation within the humidifier to be drawn into the ducts of said hot air furnace. The water retaining vessel has a removable liner which is shaped to fit within the vessel. The removable liner is preferably a bacteria resistant, rigid member of semi-flexible material to allow for the removal of built up mineral residue.

In the preferred embodiment the water level sensor is a load cell having a strain gage to register the weight changes within the water retaining vessel. The preferable load cell is an elliptical beam load cell which has an open center surrounded by a rim, having a depth and a width. A pair of tab ends are along the rim opposite one another. At least one bridge is machined within the rim, reducing the depth of the rim and increasing the sensitivity to weight changes. At least one strain gage is proximate the bridge to register the strain changes placed upon the load cell. An electronic connector transfers the strain changes from the strain gage to the control circuit. The elliptical beam load cell is affixed to the lower housing in a position to support the water retaining vessel. The elliptical beam load cell has multiple steps, or raised areas, along the rim to receive the water retaining vessel. Preferably each of the steps have receiving gaskets configured to receive the receptacle and preventing the receptacle from horizontal movement. The receiving gasket is preferably an insulating material to prevent temperature transfer between the heated water and the elliptical load cell.

In one embodiment the elliptical beam load cell has balancing means consisting of a pair of bearing receiving areas within each of the tab ends and positioned to come in contact with the support ledge. Ball bearings are dimensioned to maintain friction fit within each of the bearing receiving areas. At least one screw receiving area is proximate the center of each tab ends, each having counter-bores which have a diameter greater than the screw receiving areas. A pair of screws are dimensioned to fit within the screw receiving areas, having a screw head greater than the diameter than the body of the screw. A pair of springs, with a diameter less than the screw heads, are dimensioned to fit within the counter-bores and are, with and maintained within said counter-bores by the screw heads. Each support ledge has a threaded screw engaging area threaded to receive and retain the screw. The ball bearings allow the elliptical load cell to pivot on the support ledge while the spring maintains the ball bearings in contact with the support ledge during the mounting procedure. This provides allowances for surface variations between the elliptical beam load cell tab ends and the support ledge and prevents warpage of the elliptical beam load cell.

BRIEF DESCRIPTION OF THE DRAWINGS

The advantages of the instant disclosure will become more apparent when read with the specification and the drawings, wherein.

DETAILED DESCRIPTION OF THE INVENTION

The prior art problems of maintenance and bacteria growth are solved by a complete redesign of the steamer humidifier as disclosed herein. The water vessel is provided with a flexible liner, preferably silicon rubber, which can easily be replaced or cleaned. The housings have no moving parts to be clogged with mineral residue. The control regulating the humidity level is a standard humidity bulb, or other sensing means, connected to the control box. The water filler sensor is a unique load cell that maintains the appropriate water level by sensing the water weight variation. As a back-up, a standard emergency ball float resides with the filler spout activated by over fillings. The actual water valve that turns on/off is outside the steam chamber and is controlled by the load cell sensor. The heating element responds to the humidity request made through known sensing means. The heating element has a slow start system to avoid overheating and equipped with a high heat sensor to shut down if the system has emergency loss of water. The heating element is exposed when the liner is changed and can be easily replaced or cleaned. It is preferable that the heating element be a bi-metal (heating/cooling cracks scale), a split sheathing or a electro-polished sheathing design to prevent scale build-up.

The unique elliptical beam load cell disclosed can be used as a weight sensing means for detecting slight increments in weight change in devices having a low gross weight, as well as easier to measure larger weights. The load cell enables slight variations in liquid levels to be registered by weight versus prior art liquid level. The disclosed load cell is able to register the quantity of liquid within a vessel without being physically in contact with the liquid itself, thereby enabling the load cell to be used in applications where the liquid is corrosive or inhospitable to mechanical apparatus. This makes the load cell 12, as illustrated herein, ideal for incorporation into a humidifier for use with a whole house heating system. The basic humidifying process and water retaining apparatus are described in detail in co-pending application Ser. No. 08/319,935, now U.S. Pat. No. 5,546,926 which is incorporated herein as though recited in full.

Figure 1:
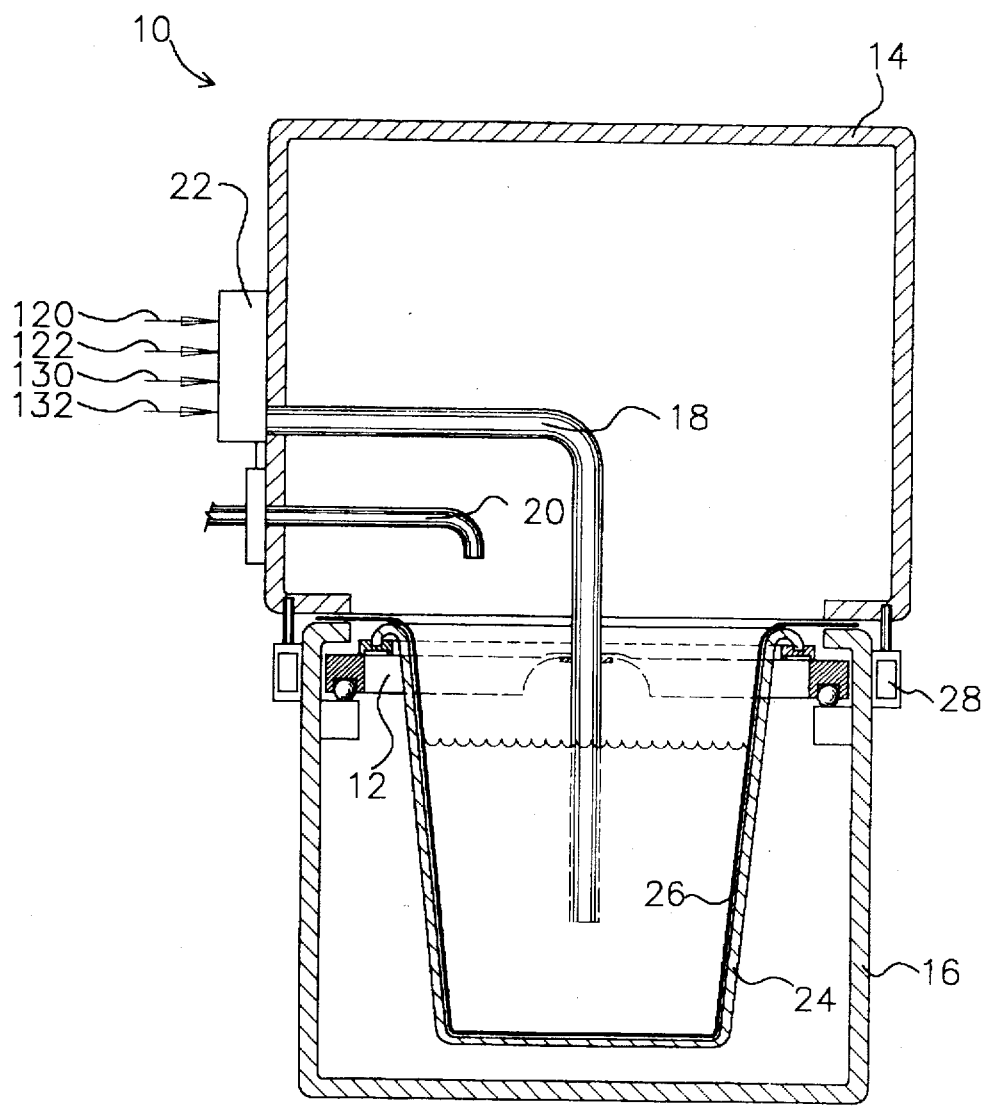
FIG. 1 is a cutaway front view of the humidifier utilizing the load cell and liner of the instant invention.

The humidifier 10, as illustrated in FIG. 1, comprises an upper housing 14 and lower housing 16. The upper housing 14 contains the heating cartridge 18, water refill pipe 20 and electrical control box 22. The heating cartridge 18 is shown herein as an immersible unit, however any type of heating unit which will generate sufficient heat to evaporate water can be used. The heat level, as well as the automatic water refill, is controlled through the electronic controls 22.

The lower housing 16 contains a water vessel 24, a contoured liner 26 and and elliptical beam load cell 12. The lower housing 16 is removably attached to the upper housing 14 through use of housing latches 28. The housing latches 28 can be of any design which allows for ready release, and reattachment, of the lower housing 16. A detachable bridge excitation voltage line 120 and bridge output voltage line 122 connect the load cell 12 to the electrical control box 22. Although it is preferable that the voltage lines 122 and 120 be completely detachable, allowing the upper housing 14 and lower housing 16 to be completely separated, the arrangement is not critical. As an alternative, both voltage lines 120 and 122 can be permanently connected to each housing with sufficient length to allow for separation of the housings and removal of the liner.

Figure 2:
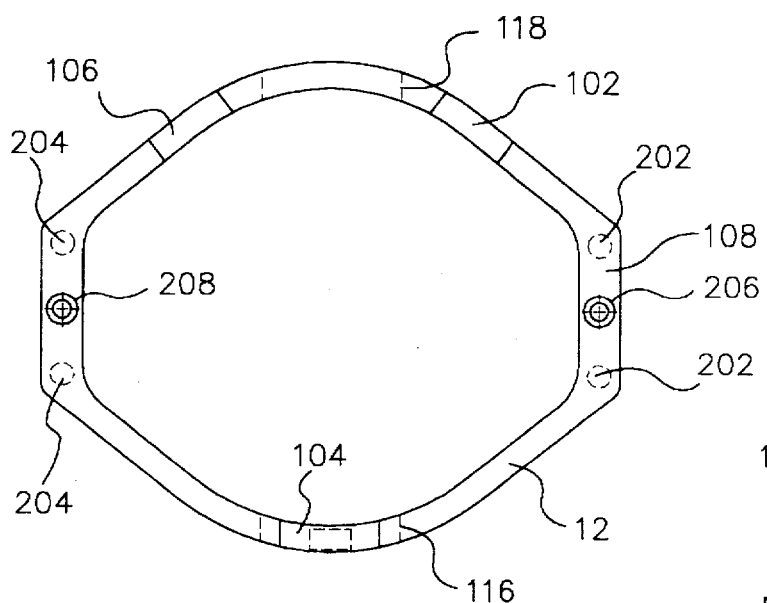
FIG. 2 is a top view of one embodiment of the elliptical beam load cell.
Figure 3:
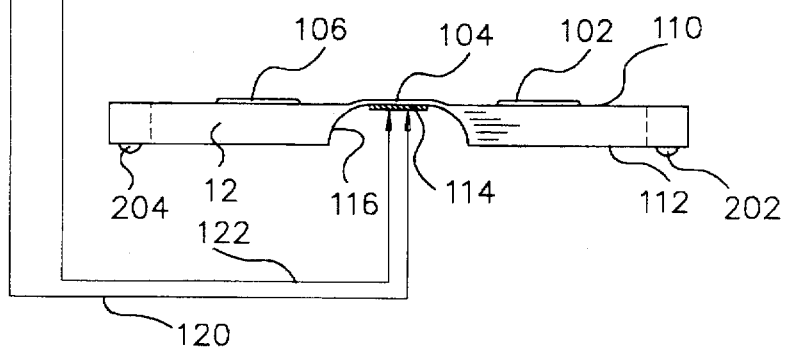
FIG. 3 is a side view of the elliptical beam load cell and strain gage of FIG. 2.
Figure 5:
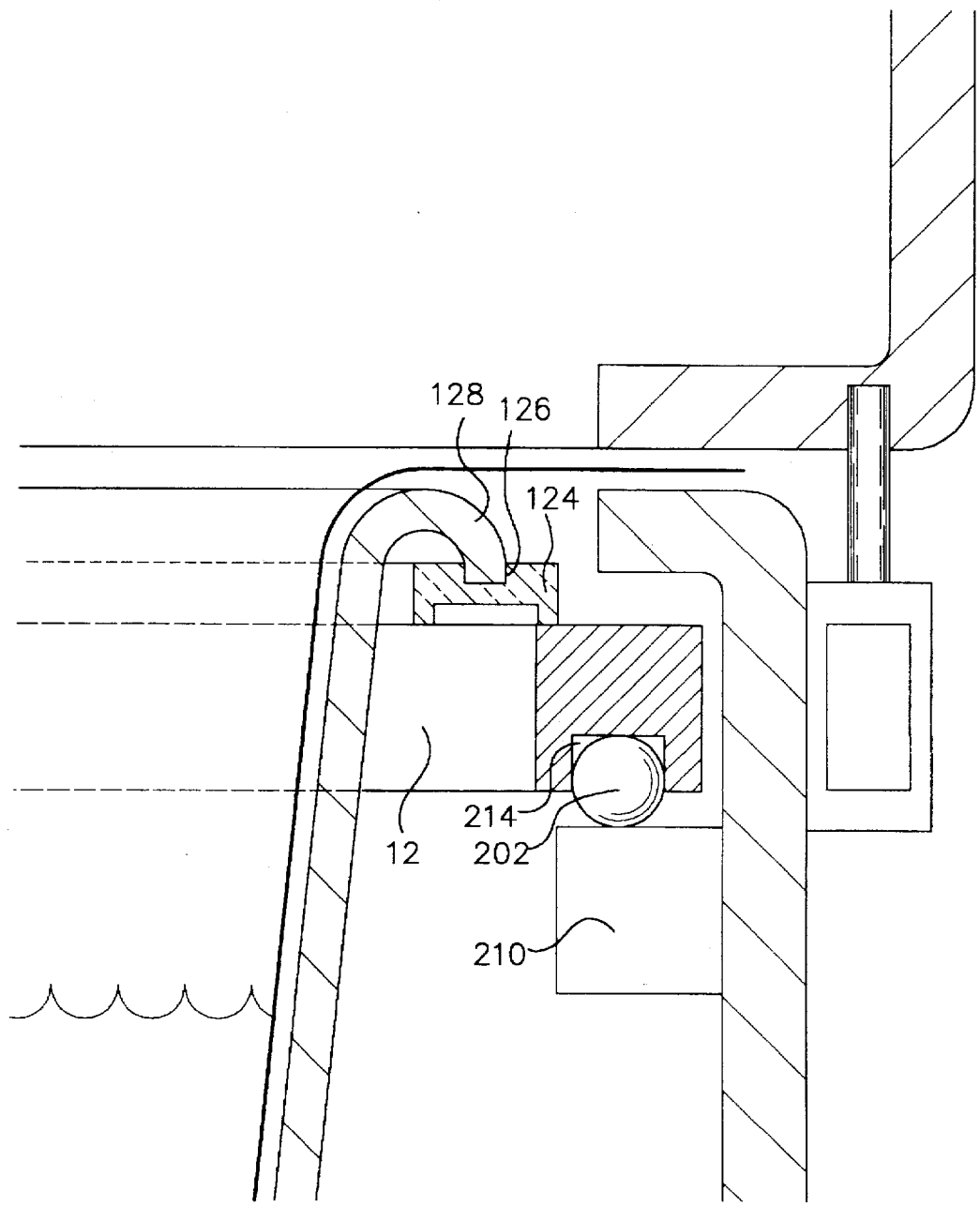
FIG. 5 is a cutaway front view of the mounting portion of the elliptical beam load cell of FIG. 2.

The elliptical beam load cell 12 is illustrated in more detail in FIGS. 2 and 3. The optimum material for manufacturing the load cells disclosed herein is a low-modulus material, such as the aluminum alloy 2024-T4, T351 or T81. The load cell 12 is manufactured with tab ends 108 at opposite ends of the modified ellipse. The tab ends 108 serve to support the load cell 12 on the support ledges 210, as illustrated in FIG. 5. Although the tab ends 108 can be either permanently or removably affixed to the lower housing 16 by various means known in the art, the preferred method is through use of ball bearings 202 and 204 in combination with screws 222 and springs 226, as described further in FIGS. 5 and 6. It is critical that whatever method used to secure load cell 12 to the lower housing 16, the tab ends 108 must be secured to prevent wobbling or rotation.

Bridges 116 and 118 are machined into the under surface 112 of the load cell 12. The bridges 116 and 118 serve to increase the sensitivity of the load cell by providing a spring element to allow for maximum strain on the metal when a load is applied. The thickness of the load cell is reduced by approximately 60–80% at the point of the bridges 116 and 118. One of the bridges 116 is equipped with a half or full Wheatstone bridge 114, or equivalent, to provide a read out of the amount of strain currently present on the load cell 12. A basic Wheatstone bridge measuring circuit consists of two (half) or four (full) strain gage grids electronically connected and is recommended for use with the instant invention due to its accuracy and sensitivity with static strain circuits. Alternate bridge designs can be used and are disclosed further herein in FIGS. 16–20.

Current is fed to the the load cell 12 through the bridge excitation voltage line 120. The amount of load placed on the load cell 12 varies the strain of the metal, which in turn alters the current. The change in current is registered at the Wheatstone bridge 114 and fed through the bridge output voltage line 122 to the electrical control 22. A base level strain is set at time of manufacture and a lessening of this base level indicates less weight being placed on the load cell. The electronics registering the load change, activating the water refill, etc., can be configured in any method known in the art.

To provide optimum stability, the upper surface 110 is manufactured with steps 102, 104 and 106 to support the water vessel 24. The steps 102, 104 and 106 concentrate the weight contained within the cup 24 approximate the bridges 116 and 118. The placement of the steps 102 and 106 are at approximately a 45° angle from an imaginary center line drawn between the two bridges 116 and 118. The third step 104 is placed directly over the bridge 116 containing the strain gage 114. The placement of the steps 102, 104 and 106 in a triangular configuration, allows for the maximum stability and optimizes the location of the pressure placed on the load cell 12. A further advantage to the use of the steps 102, 104 and 106 is the increased tolerance in both cup 24 and load cell 12 manufacturing. Any surface differences between the cup 24 and the load cell 12 will result in an imbalance of pressure placement and therefore a decrease in accuracy.

Figure 4:
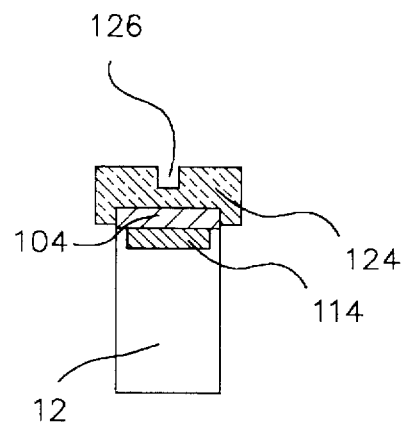
FIG. 4 is a cross section view of the elliptical beam load cell and step with gasket added.

To prevent slippage of the vessel 24, a channeled gasket 124 is affixed to the steps 102, 104 and 106 as shown in FIGS. 4 and 5. The gasket 124 is preferable manufactured in a U-shape to fit dimensioned to form a friction fit over the steps 102, 104 and 106. Alternatively, the gasket 124 can be affixed through use of appropriate adhesives known in the art. The gasket 124 is provided with a channel 126 dimensioned to receive the vessel flange 128, simultaneously cushioning the vessel 24 while preventing horizontal movement. The gasket 124 provides the additional advantage of further extending the tolerance of surface differences between the flange 128 and the load cell 12. The gasket 124 is preferable manufactured from a insulating material to provide the advantage of avoiding heat transfer from the vessel 24 to the load cell 12, thereby avoiding possible warpage of the load cell 12.

Figure 6:
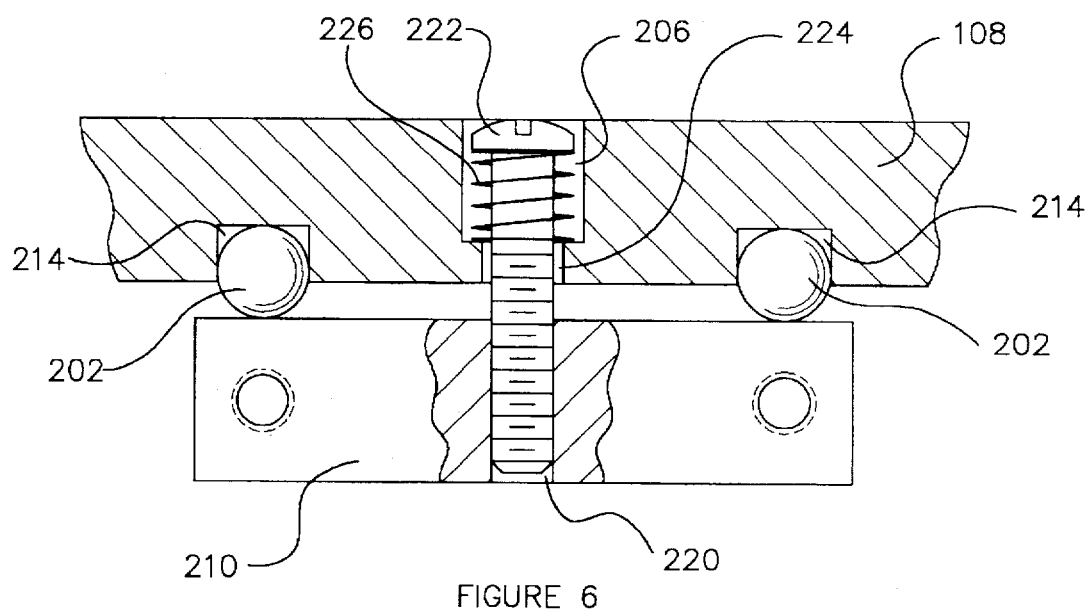
FIG. 6 is a cutaway end view of the elliptical beam load cell and support ledge.

In FIG. 6 the tab end 108 is shown mounted to the support ledge 210 through use of a screw 222. The ball bearings 202 and 204 are equally spaced within the tab 108 from the screw hole 224 and receiving area 220. The ball bearings 202 are snapped into and maintained in the bearing receiving notch 214 by a friction fit. A threaded receiving area 220 is machined into the support ledge 210 to receive the screw 222 and secure the load cell. A counterbore 206 is machined into the tab end 108 to provide a receiving area for the spring 226 and screw head 222. The compression spring 226 has a diameter less than the machined counterbore 224 and head of the screw 222, thereby maintaining the compression spring 226 between the head of the screw 222 and screw receiving area 224. Tightening the screw 222 pulls the tab 108 and the support ledge 210 together until contact is made between the ball bearings 202 and the support ledge 210. The resistance created by the compression spring 226 keeps the support ledge 210 from becoming tightly fixed to the ball bearings 202. This allows the support ledge 210 to pivot on the ball bearings 202 so it will adjust to the wall mounting on the lower housing 16. This floating adjustment will keep a twisting action off the load cell.

Figure 7:
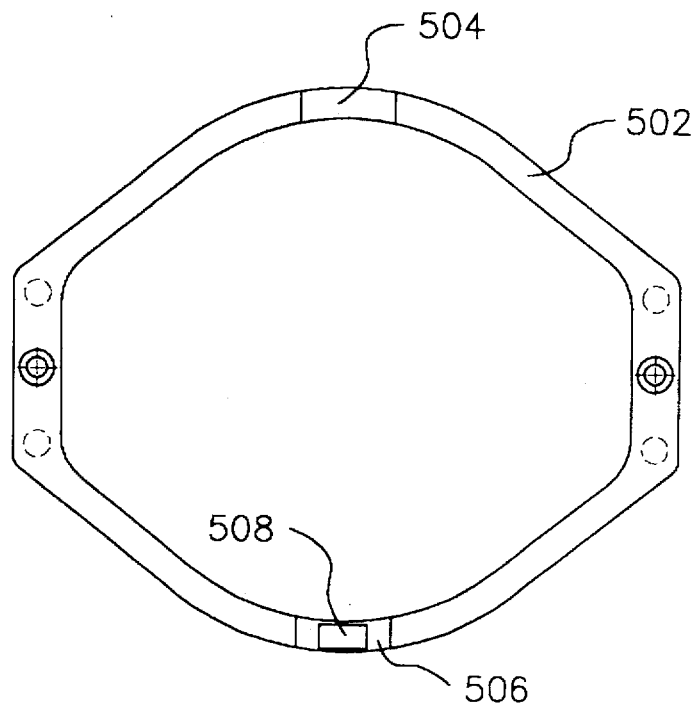
FIG. 7 is a top view of an alternate embodiment of the instant load cell.
Figure 8:
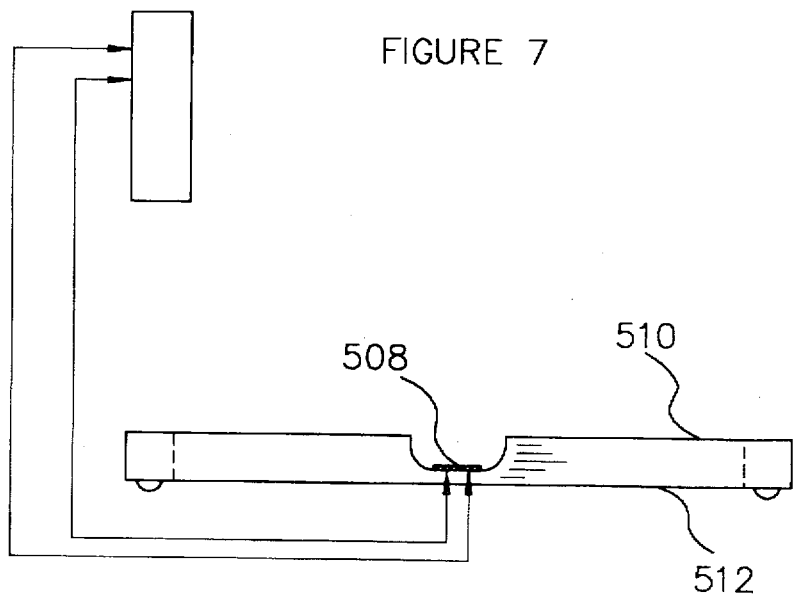
FIG. 8 is a side view of the load cell and strain gage of FIG. 7.

An alternate load cell 502 is illustrated in FIGS. 7 and 8. In this embodiment, the bridges 504 and 508 are machined in the upper surface 510 of the load cell 502. The cup 24 rests directly on the load cell 502, spanning the bridges 504 and 506. As stated heretofore, in this embodiment the tolerances between the load cell 502 and the cup 24 must be minimal.

Figure 9:
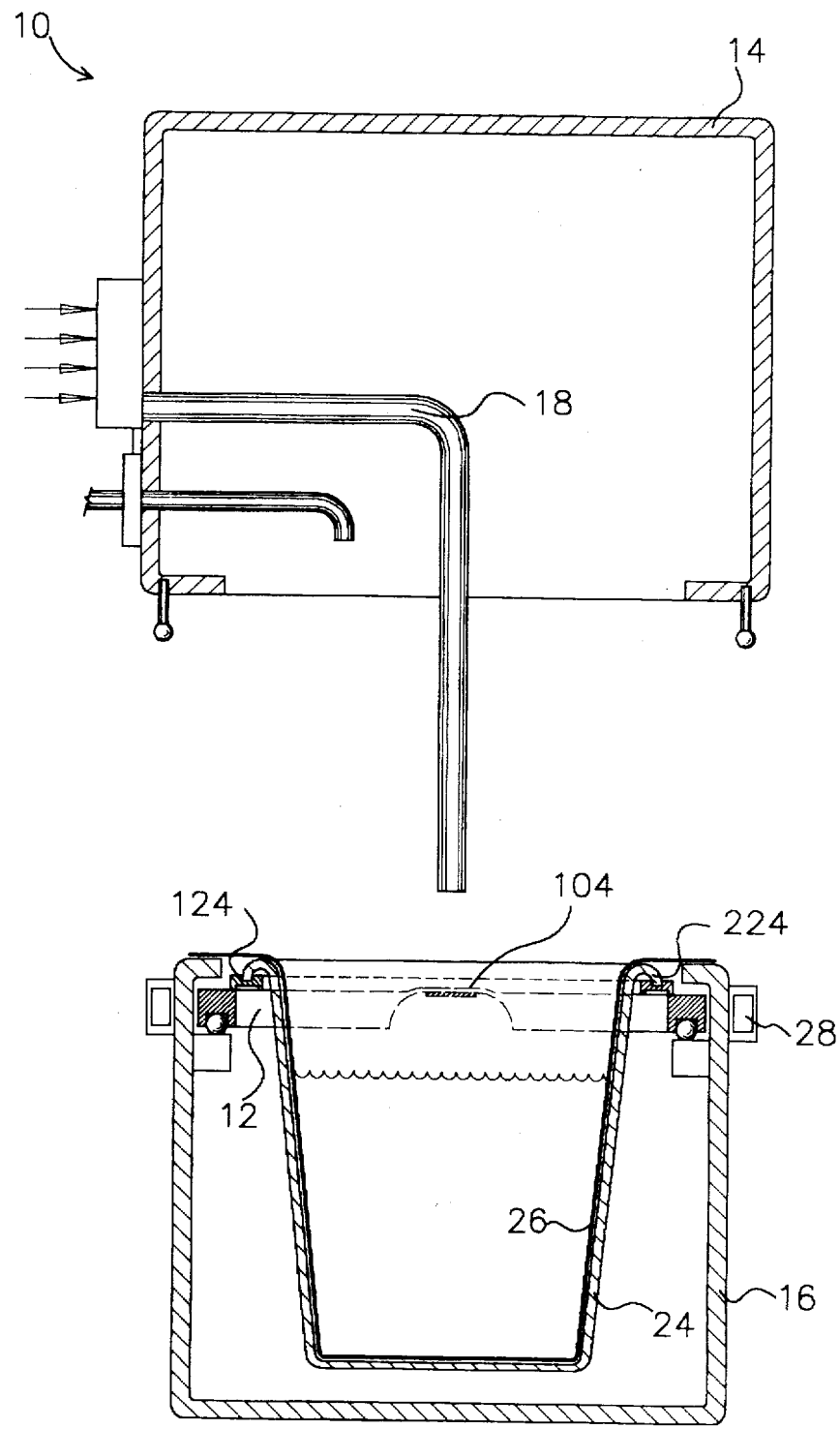
FIG. 9 is an cutaway front view of the humidifier of FIG. 1 with the upper and lower housings separated.

In FIG. 9 the top housing 14 and bottom housing 16 are shown removed for cleaning or disposal of the liner 26. For safety purposes, it is preferable to turn off the humidifier 10 prior to separation to allow the heating unit 18 to cool. Once both voltages lines 120 and 122 are disconnected, the lower housing 16 is completely separable from the upper housing 14. Due to the unique design of the humidifier 10, the lower housing 16 can be easily removed with the water vessel 24 full with little or no spillage. The water vessel 24 can be manufactured from stainless steel or any number of appropriate materials known in the art. To clean or replace the liner 26 the water vessel 24 is removed from the load cell 12 and emptied. The elliptical shape of the load cell allows the water vessel 24 to be easily grasped between the water vessel 24 rim and the tab ends 108. The liner 26 is preferably manufactured from silicone rubber or other equivalent material, including impregnated cloth, to facilitate cleaning. The material should be inert, bacteria resistant and semi-rigid. By providing a slight degree of flexibility, the liner 26 can be "flexed" to remove the built up residue without scrubbing. It is preferable that the material of manufacture for the liner 26 be such to allow for economical disposal of the liner 26 if so desired.

Figure 10:
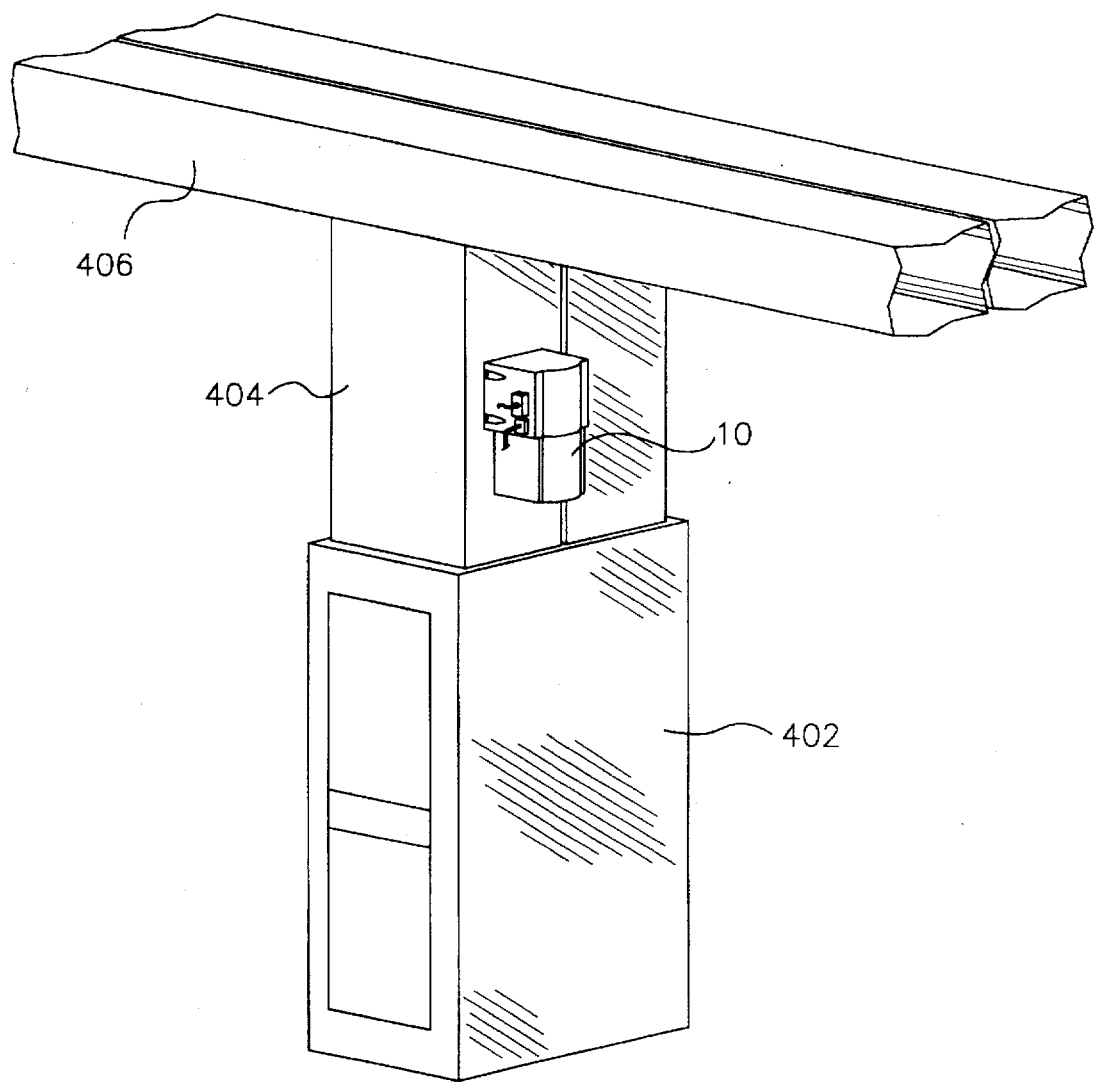
FIG. 10 is a perspective view of the humidifier of the instant invention installed on a furnace.

The humidifier 10 is shown installed on the plenum 404 of a furnace 402 in FIG. 10. Although the humidifier 10 can be installed on the horizontal duct work 406, the humidification would not be as equally dispersed as the with the plenum mounting 404. The small size of the humidifier 10 in relation to the furnace 402 is readily seen in this Figure, facilitating installation, on new or existing furnaces. The size additionally makes the unit easy to clean as it can be readily held in the user's hand.

Figure 11:
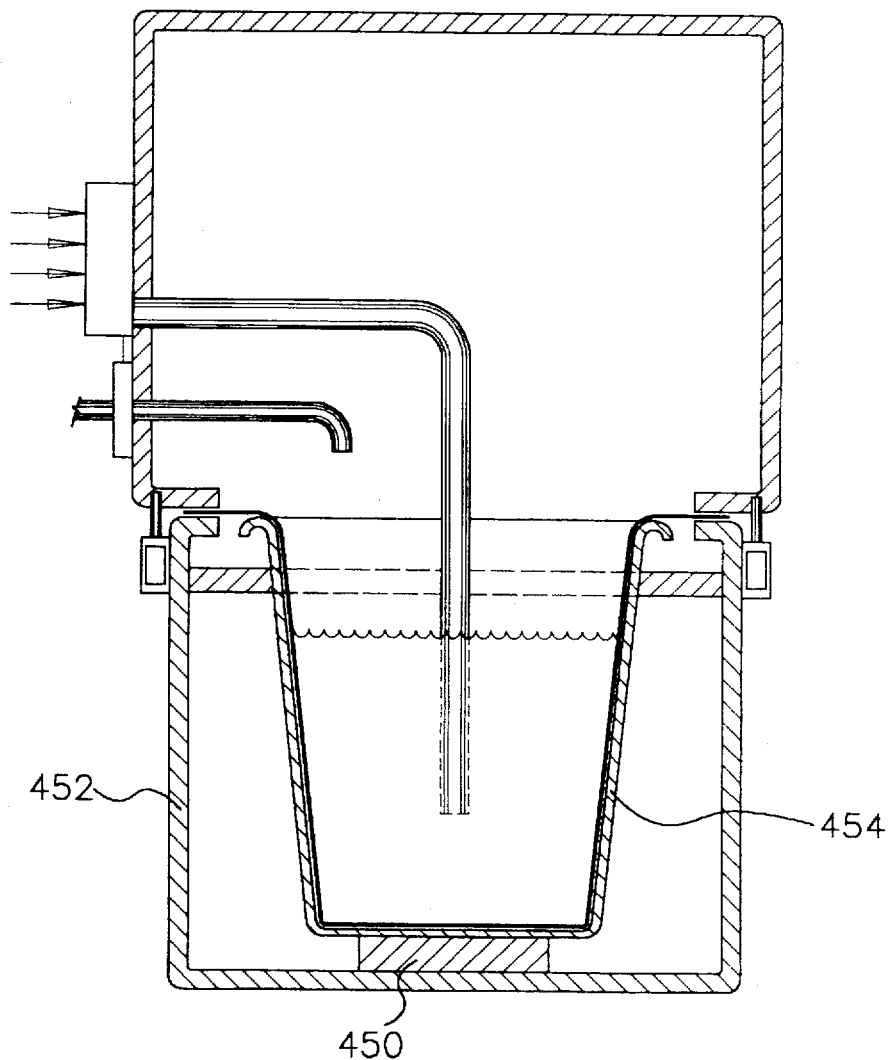
FIG. 11 is a cutaway front view of an alternate load cell for use with the disclosed humidifier.

In FIG. 11 the compression load cell 450 is placed directly on the base of the lower housing 452 and the water vessel 454 placed on top of the compression load cell 450. The compression load cell 450 reacts to the changes in water weight as described heretofore, sending the signal through the bridge output voltage line (not shown).

Figure 12:
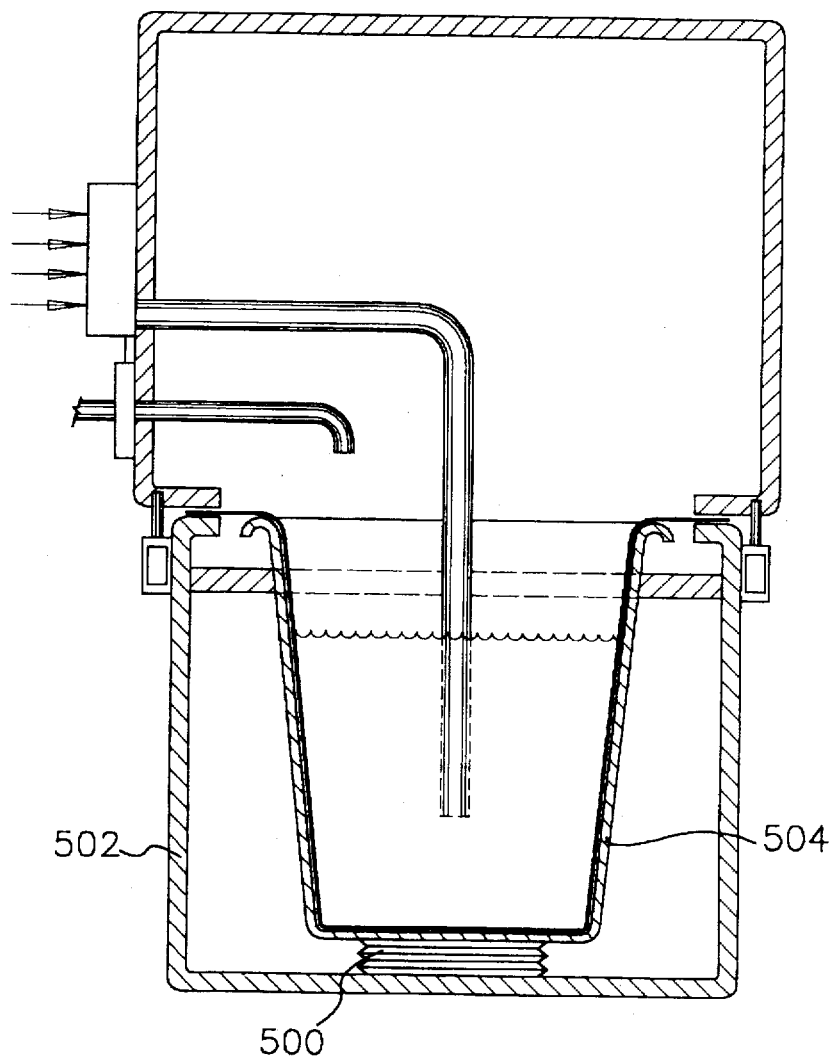
FIG. 12 is a cutaway front view of the humidifier of the instant invention utilizing diaphragm switch.

FIG. 12 illustrates a diaphragm switch 500 placed at the base of the lower housing 502. The water vessel 504 is placed directly on the diaphragm switch 500. When the water weight in the vessel 504 becomes low, the diaphragm switch 500 will click on which transmits a signal to the electrical control box for a water refill.

Figure 13:
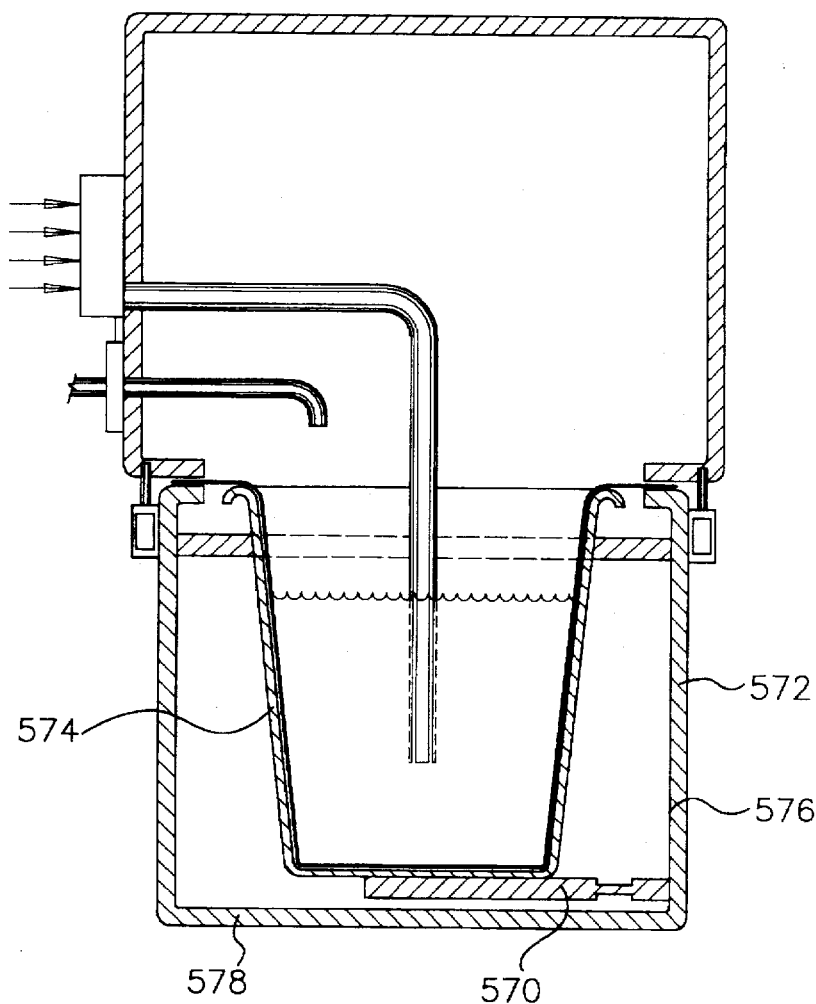
FIG. 13 is a cutaway front view of a straight cantilever beam load cell for use with the disclosed humidifier.

In FIG. 13 a straight cantilever beam load cell is utilized to indicate the level associated weight changes in the water vessel 574. The beam load cell 570 is affixed to the wall 576 of the lower housing 572 slightly above the base 578. The strain placed on the floating beam load cell 570 is registered by strain gages in a Wheatstone bridge circuit design (not shown). The gages are mounted on the upper and lower spring element surfaces of the beam and transmit the load measurement to the electrical controls as described heretofore.

Figure 14:
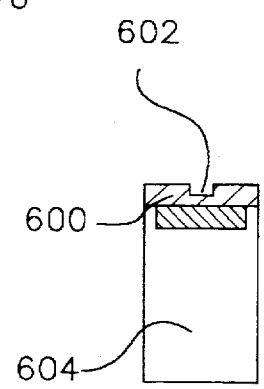
FIG. 14 is a cross sectional view of an alternate elliptical beam load cell and step.

FIG. 14 illustrates a cross-sectional of an alternate embodiment to the steps disclosed herein. The step 600 is either machined as part of, or added to, the load cell 604. A channel 602, dimensioned and positioned to receive the flange of a water vessel, is machined into each of the steps 600.

Figure 15:
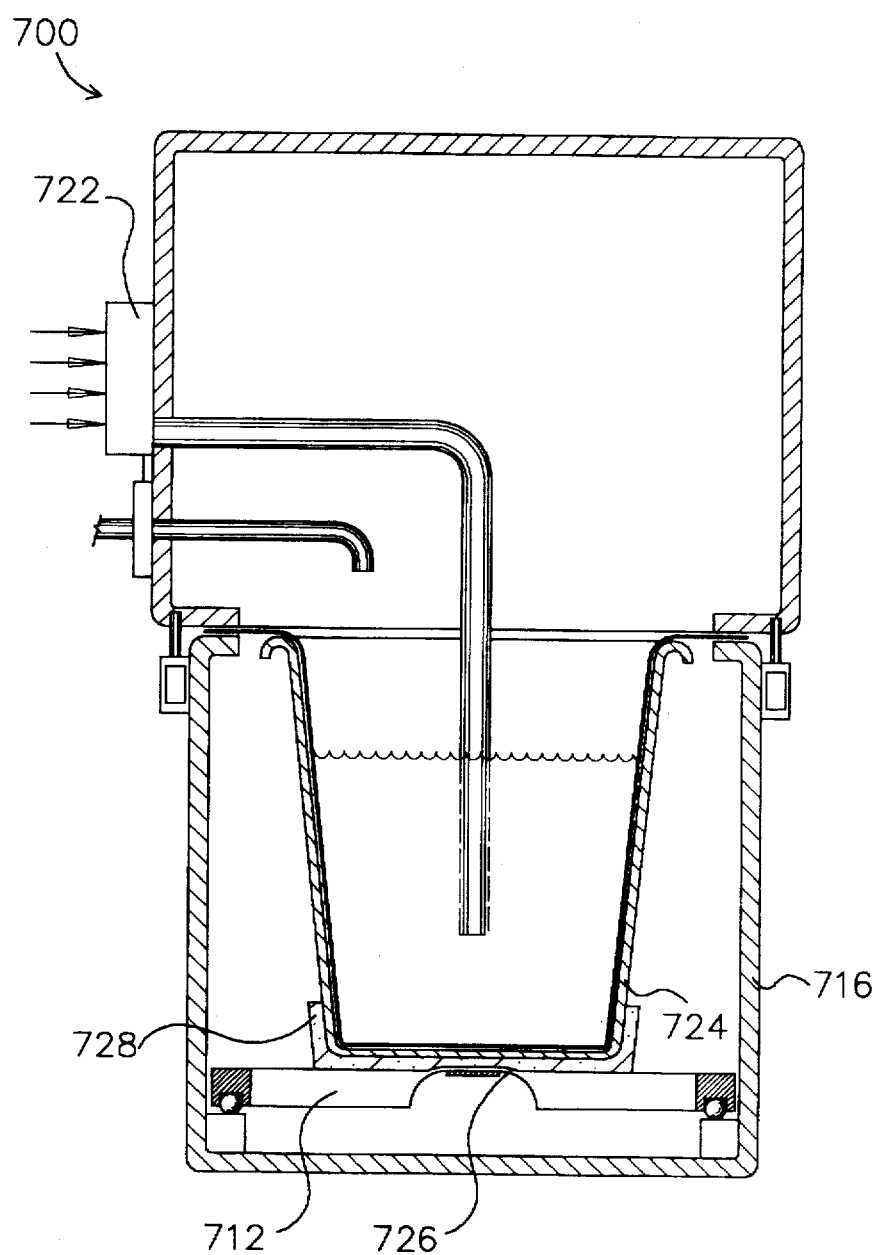
FIG. 15 is a cutaway front view of the humidifier incorporating an alternate positioning of the elliptical beam load cell.

In FIG. 15 the humidifier 700 has the elliptical load cell 712 placed at the bottom of the lower housing 716. The dimensioning of the load cell 712 has been modified to support the bottom of the water vessel 724 rather than suspend the vessel as disclosed heretofore. The steps 726 are placed as previously described, however the U-shaped gasket has been replaced with an L-shaped gasket 728. The L-shape of the gasket 728 prevents horizontal movement of the bottom of the water vessel 724 while placing the load emphasis on the strain gages.

Figure 16:
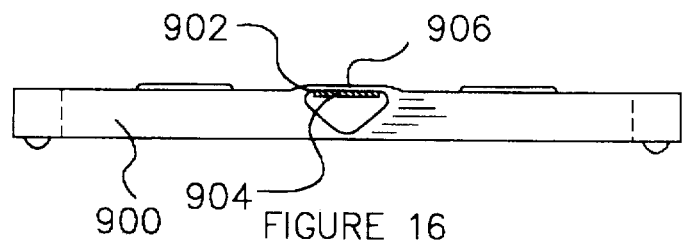
FIG. 16 is a side view of an alternate elliptical beam load cell with a step and strain gage bridge.
Figure 17:
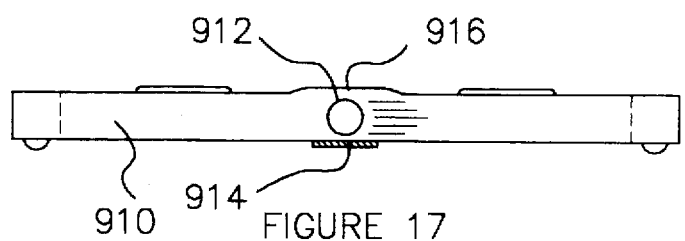
FIG. 17 is a side view of an alternate elliptical beam load cell with a step and circular strain gage cutout.
Figure 18:
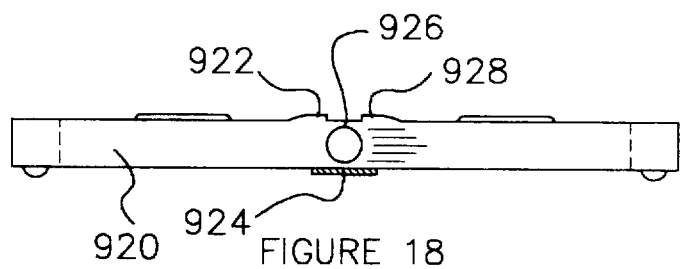
FIG. 18 is a side view of an additional elliptical beam load cell with dual steps and circular strain gage cutout.
Figure 19:
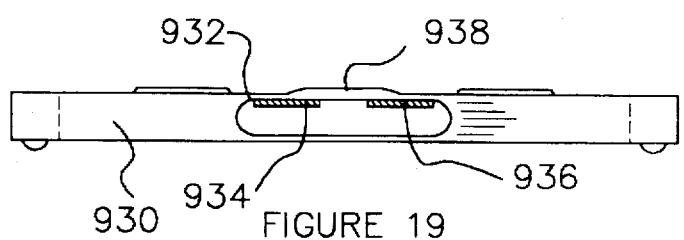
FIG. 19 is a side view of an additional elliptical beam load cell with singular step, oval cutout and dual strain gage sets; and, FIG. 20 is a side view of an additional elliptical beam load cell with dual cutouts and strain gage sets.
Figure 20:
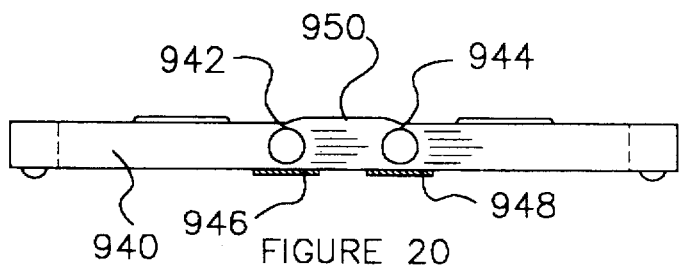

FIGS. 16–20 illustrate alternate configurations to the foregoing bridges, providing variations to the heretofore disclosed spring element or bridge. In FIG. 16 the elliptical beam load cell 900 has a modified inverted triangle cutout as a bridge 902. The strain gage 904 is placed directly below the single step 906. The elliptical beam load cell 910 of FIG. 17 uses a circular cutout for the bridge 912. The strain gage 914 is placed at the underside of the load cell 910, opposite the singular step 916. The elliptical load cell 920 of FIG. 18 utilizes dual steps 926 and 928 positioned on either side of the circular cutout bridge 922. The strain gage 924 is placed on the underside of the load cell 920 below the bridge 922. For applications requiring extreme accuracy, such as in the medical field, dual strain gage sets are used to average the weight changes. In FIG. 19 an oval cutout is used in the elliptical load cell 930 for the bridge 932. Dual strain gage sets 934 and 936 are placed within the bridge 932 on either side of the step 938. Elliptical load cell 940 of FIG. 20 has dual circular cutout bridges 942 and 944 placed at either end of the step 950. The strain gage sets 946 and 948 are placed below the bridges 942 and 944 on the underside of the load cell 940.

The embodiments disclosed in FIGS. 16 and 19 offer the advantage of the placement of a hermetic seal for ultimate protection against moisture. FIGS. 17, 18 and 19 provide the advantage of a lower production cost. The circular cutout designs are drilled which reduces machining time. Any of the foregoing combinations can be used in conjunction with one another to produce the optimum elliptical beam load cell for each individual application.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A humidifier for use with a hot air furnace comprising:
   an upper housing, said upper housing having:
      heating means, said heating means including temperature sensing means and on/off means;
      water refill means,
      control means,
   a lower housing, said lower housing being removably connected to said upper housing and containing:
      a water retaining vessel;
      a water level sensor means, said water level sensor means being secured to a support ledge and positioned to receive said water retaining vessel and sense the minimum and maximum water weight within said water retaining vessel;
   said control means being connected to said water level sensor means, said heating means and said water refill means, wherein said control means controls the water level based on the weight information received from said water level sensor means and activates said on/off means based on information received from said temperature sensing means, thereby providing a constant level of evaporation within said humidifier to be drawn into the ducts of said hot air furnace.

2. The humidifier of claim 1, further comprising a removable liner, said removable liner being shaped to fit within the interior of said vessel.

3. The humidifier of claim 2, wherein said removable liner is a bacteria resistant, rigid member of semi-flexible material to allow for the removal of built up mineral residue.

4. The humidifier of claim 1, wherein said water level sensor means is a load cell having a strain gage to register the weight changes within said water retaining vessel.

5. The humidifier of claim 4 wherein said load cell is an elliptical beam load cell, said elliptical beam load cell having:
   an open center, said open center being surrounded by a rim, said rim having a depth and a width;
   a pair of tab ends, said pair of tab ends being along said rim opposite one another,
   at least one bridge, said at least one bridge being machined within said rim, reducing the depth of said rim and increasing the sensitivity of said elliptical beam load cell to weight changes,
   a strain gage, said strain gage being proximate said bridge to register the strain changes placed upon said load cell,
   electronic connector means, said electronic connector means transferring said strain changes from said strain gage to said control means,
   wherein said elliptical beam load cell is affixed to said lower housing in a position to support said water retaining vessel.

6. The humidifier of claim 5 further comprising multiple steps, said multiple steps being raised areas along said rim to receive said water retaining vessel.

7. The elliptical load cell of claim 6 further comprising receiving gaskets, said receiving gaskets being dimensioned to fit on each of said multiple step areas and configured to receive said receptacle, thereby preventing said receptacle from horizontal movement.

8. The elliptical load cell of claim 7 wherein said receiving gasket is an insulating material to prevent temperature transfer between the heated water of said water retaining vessel and said elliptical load cell.

9. The humidifier of claim 5 wherein said elliptical beam load cell further comprises balancing means, said balancing means having:
   a pair of bearing receiving areas within each of said tab ends and positioned to come in contact with said support ledge;
   at least two pair of ball bearings, said ball bearings being dimensioned to maintain friction fit within said bearing receiving areas;
   at least a pair of screw receiving areas, said screw receiving areas being proximate the center of said tab ends and having counter-bores, said counter-bores having a diameter greater than said screw receiving areas;
   a pair of screws, said screws being dimensioned to fit within said screw receiving areas and having a screw head greater than the diameter than the body of said screw;
   a pair of springs, said pair of springs being dimensioned to fit within said counter-bores and having a diameter less than the diameter of said screw heads, thereby being maintained within said counter-bores by said screw heads;
   a pair of threaded screw engaging areas, said screw engaging areas being threaded to receive and retain said screw in said support ledge;
   wherein said ball bearings allow said elliptical load cell to pivot on said support ledge and said spring maintains said ball bearings in contact with said support ledge, during the mounting procedure thereby allowing for surface variations between said elliptical beam load cell tab ends and said support ledge and prevent warpage of said elliptical beam load cell.

10. The humidifier of claim 1, wherein said sensor means is a device for monitoring and registering weight changes within said water retaining vessel.

11. The method of maintaining a level of home humidity through furnace ducts using a hot air furnace humidifier, said humidifier having:
   an upper housing, said upper housing having
      control means,
      heating means, said heating means incorporating heat sensing means, said heat sensing means being connected to said control means;
      water refill means, said water refill means being connected to said control means,
   a lower housing, said lower housing being removably connected to said upper housing and having:
      a water retaining vessel;
      a water level sensor means, said water level sensor means being positioned to receive said water retaining vessel and register the minimum and maximum water weight within said water retaining vessel, said water level sensor being connected to said control means;
comprising the steps of:
   placing said water retaining vessel within humidifier,
   activating said power source,
   registering the current water weight on said water level sensor,
   transmitting said water weight to said control means,
   activating said water refill means to fill said vessel until the water reaches a maximum weight,
   deactivating said water refill means when said water reaches said maximum weight, transmitting said upper housing's current temperature to said control means, activating said heating means to raise said temperature in said heat chamber to a level sufficient to cause water evaporation, allowing the moisture created through evaporation to rise through said duct into said furnace duct work, monitoring said water and heat levels to constantly maintain a predetermined water level and temperature to cause water evaporation, whereby said moisture is distributed throughout the house through said furnace duct work, raising the humidity level throughout the house.

* * * * *